United States Patent
Rai et al.

(10) Patent No.: US 7,125,179 B1
(45) Date of Patent: Oct. 24, 2006

(54) SYSTEM AND METHOD OF EVALUATING PRINT SHOP CONSOLIDATION OPTIONS IN AN ENTERPRISE

(75) Inventors: Sudhendu Rai, Fairport, NY (US); Jie Lin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/185,202

(22) Filed: Jul. 19, 2005

(51) Int. Cl.
*B41J 5/30* (2006.01)

(52) U.S. Cl. .................. 400/62; 400/61; 358/1.13; 358/1.15; 700/99; 700/100

(58) Field of Classification Search ............ 400/61–63, 400/70, 76; 358/1.1–1.9; 700/99–105, 32, 700/36
See application file for complete search history.

(56) References Cited

U.S. PATENT DOCUMENTS

| | | | |
|---|---|---|---|
| 4,896,269 A * | 1/1990 | Tong .................. | 700/101 |
| 6,633,821 B1 | 10/2003 | Jackson et al. ............ | 702/56 |
| 6,805,502 B1 * | 10/2004 | Rai et al. ................ | 400/61 |
| 7,079,266 B1 * | 7/2006 | Rai et al. ................ | 358/1.13 |
| 2002/0071134 A1 | 6/2002 | Jackson et al. ........... | 358/1.13 |
| 2002/0129081 A1 | 9/2002 | Rai et al. ................ | 709/102 |
| 2003/0041765 A1 * | 3/2003 | Hill ...................... | 101/484 |
| 2003/0149747 A1 | 8/2003 | Rai et al. ................ | 709/219 |
| 2005/0151993 A1 * | 7/2005 | Gartstein et al. .......... | 358/1.15 |

* cited by examiner

*Primary Examiner*—Minh Chau
(74) *Attorney, Agent, or Firm*—Ortiz & Lopez, PLLC

(57) ABSTRACT

A system and method of evaluating the required operating capacities for each production function for each consolidation configuration of distributed print shops in an enterprise so that the most appropriate print shop consolidation options can be selected. Operating capacities of each production function for processing print jobs at each shop is initially determined on the basis that the print jobs can originate and be processed at the same print shop. The operating capacities are modified to take into account scenarios in which the print jobs can originate at each print shop and can be transported to each other print shop for processing. The determined maximum operating capacities at each shop can be mapped out for each possible configuration of consolidating a selected number of print shops into a selected number of consolidated shops.

20 Claims, 7 Drawing Sheets

| JobData | | | | | | | |
|---|---|---|---|---|---|---|---|
| Jobid | Arrival | Due | Nbooks | BW/Printing | ColorPrinting | Scanning | Packaging |
| 272028 | 9/9/2004 7:59:00 AM | 9/10/2004 4:00:00 PM | 4000 | 4000 | 0 | 0 | 0 |
| 272031 | 9/9/2004 9:00:00 AM | 9/10/2004 4:00:00 PM | 360 | 0 | 360 | 0 | 0 |
| 271542 | 9/9/2004 9:00:00 AM | 9/10/2004 4:00:00 PM | 1190 | 1190 | 0 | 330 | 0 |
| 272033 | 9/9/2004 10:00:00 AM | 9/10/2004 4:00:00 PM | 500 | 0 | 500 | 0 | 0 |
| 255272 | 9/9/2004 10:00:00 AM | 9/10/2004 4:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 4:00:00 PM | 16017 | 16017 | 0 | 0 | 0 |
| 271565 | 9/13/2004 10:59:00 AM | 9/13/2004 4:00:00 PM | 5520 | 5520 | 0 | 0 | 0 |
| 271562 | 9/13/2004 10:59:00 AM | 9/13/2004 4:00:00 PM | 6640 | 6640 | 0 | 40 | 0 |
| 271563 | 9/13/2004 10:59:00 AM | 9/13/2004 4:00:00 PM | 14950 | 14950 | 0 | 0 | 0 |
| 271560 | 9/13/2004 11:29:00 AM | 9/13/2004 4:00:00 PM | 10250 | 10250 | 0 | 0 | 0 |
| 271561 | 9/13/2004 11:29:00 AM | 9/13/2004 1:59:00 PM | 180 | 0 | 180 | 0 | 0 |
| 271564 | 9/14/2004 10:00:00 AM | 9/14/2004 4:00:00 PM | 4400 | 4400 | 0 | 0 | 0 |
| 271567 | 9/14/2004 10:00:00 AM | 9/14/2004 4:00:00 PM | 11700 | 11700 | 0 | 0 | 0 |
| 271566 | 9/14/2004 10:00:00 AM | 9/14/2004 4:00:00 PM | 14400 | 14400 | 0 | 0 | 0 |
| 278192 | 9/14/2004 1:00:00 PM | 9/15/2004 4:00:00 PM | 5640 | 5640 | 0 | 0 | 0 |
| 271568 | 9/15/2004 10:59:00 AM | 9/15/2004 4:00:00 PM | 2310 | 2310 | 0 | 0 | 0 |

FIG. 3

| Date | BWPrinting |
|---|---|
| 9/9/2004 | 513 |
| 9/10/2004 | 660 |
| 9/13/2004 | 8625 |
| 9/14/2004 | 6194 |
| 9/15/2004 | 1573 |

FIG. 4

| JobData | | | | | | | |
|---|---|---|---|---|---|---|---|
| Jobid | Arrival | Due | nbooks | BWPrinting | ColorPrinting | Scanning | Packaging |
| 272028 | 9/9/2004 7:59:00 AM | 9/10/2004 3:00:00 PM | 4000 | 4000 | 0 | 0 | 0 |
| 272031 | 9/9/2004 9:00:00 AM | 9/10/2004 3:00:00 PM | 360 | 0 | 360 | 0 | 0 |
| 271542 | 9/9/2004 9:00:00 AM | 9/10/2004 3:00:00 PM | 1190 | 1190 | 0 | 330 | 0 |
| 272033 | 9/9/2004 10:00:00 AM | 9/10/2004 3:00:00 PM | 500 | 0 | 500 | 0 | 0 |
| 255272 | 9/9/2004 10:00:00 AM | 9/10/2004 3:00:00 PM | 3055 | 3055 | 0 | 300 | 0 |
| 272027 | 9/10/2004 7:00:00 AM | 9/10/2004 4:00:00 PM | 1172 | 1172 | 0 | 0 | 0 |
| 272035 | 9/13/2004 9:00:00 AM | 9/15/2004 3:00:00 PM | 16017 | 16017 | 0 | 0 | 0 |
| 271565 | 9/13/2004 10:59:00 AM | 9/13/2004 3:00:00 PM | 5520 | 5520 | 0 | 0 | 0 |
| 271562 | 9/13/2004 10:59:00 AM | 9/13/2004 3:00:00 PM | 6640 | 6640 | 0 | 40 | 0 |
| 271563 | 9/13/2004 10:59:00 AM | 9/13/2004 3:00:00 PM | 14950 | 14950 | 0 | 0 | 0 |
| 271560 | 9/13/2004 11:29:00 AM | 9/13/2004 3:00:00 PM | 10250 | 10250 | 0 | 0 | 0 |
| 271561 | 9/13/2004 11:29:00 AM | 9/13/2004 12:59:00 PM | 180 | 0 | 180 | 0 | 0 |
| 271564 | 9/14/2004 10:00:00 AM | 9/14/2004 3:00:00 PM | 4400 | 4400 | 0 | 0 | 0 |
| 271567 | 9/14/2004 10:00:00 AM | 9/14/2004 3:00:00 PM | 11700 | 11700 | 0 | 0 | 0 |
| 271566 | 9/14/2004 10:00:00 AM | 9/14/2004 3:00:00 PM | 14400 | 14400 | 0 | 0 | 0 |
| 278192 | 9/14/2004 1:00:00 PM | 9/15/2004 3:00:00 PM | 5640 | 5640 | 0 | 0 | 0 |
| 271568 | 9/15/2004 10:59:00 AM | 9/15/2004 3:00:00 PM | 2310 | 2310 | 0 | 0 | 0 |

FIG. 6

| Date | BWPrinting |
|---|---|
| 9/9/2004 | 548 |
| 9/10/2004 | 715 |
| 9/13/2004 | 10862 |
| 9/14/2004 | 7280 |
| 9/15/2004 | 1758 |

FIG. 7

|    | S1    | S2    | S3    |
|----|-------|-------|-------|
| S1 | 8625  | 10682 | 14858 |
| S2 | 10386 | 9078  | 9382  |
| S3 | 6633  | 3379  | 3160  |

FIG. 8

|       | S1   | S2    |       |
|-------|------|-------|-------|
| S1    | 8625 |       |       |
| S2    |      | 9078  |       |
| S3    |      | 3379  |       |
| Total | 8625 | 12457 | 21082 |

FIG. 9

|       | S1 | S2    | S3   |       |
|-------|----|-------|------|-------|
| S1    |    | 10862 |      |       |
| S2    |    | 9078  |      |       |
| S3    |    |       | 3160 |       |
| Total | 0  | 19940 | 3160 | 23100 |

FIG. 10

|       | S1   | S2 | S3    |       |
|-------|------|----|-------|-------|
| S1    | 8625 |    |       |       |
| S1    |      |    | 9382  |       |
| S1    |      |    | 3160  |       |
| Total | 8625 | 0  | 12542 | 21167 |

FIG. 11

| CONSOLIDATION OPTION | TYPE | TAKT-RATE REQUIREMENT |
|---|---|---|
| S1 & S2 | TWO LOCATIONS | 21082 |
| S1 & S3 | TWO LOCATIONS | 21167 |
| S2 & S3 | TWO LOCATIONS | 23100 |
| S2 | SINGLE LOCATION | 23319 |
| S1 | SINGLE LOCATION | 25644 |
| S3 | SINGLE LOCATION | 27400 |

SYSTEM AND METHOD OF EVALUATING PRINT SHOP CONSOLIDATION OPTIONS IN AN ENTERPRISE

TECHNICAL FIELD

Embodiments relate to production printing and, more particularly, to systems and methods of evaluating print shop consolidation options in an enterprise.

BACKGROUND

An enterprise of geographically distributed print shops is a frequent occurrence in the production printing industry. Typically, resources in print shops are organized so that when a print job arrives from a customer at a particular print shop, the print job can be processed by performing one or more production functions. Maintaining print shops at multiple locations often necessitates providing the same labor and facilities at each individual site which, in turn, can lead to inefficient distribution of equipment and labor among the print shops.

Consolidating multiple print shop sites into fewer sites can save labor and facility costs. However, known methods of print shop consolidation are based on random or improvised approaches which cannot reliably and accurately provide the most appropriate print shop consolidation options and which, therefore, result in inefficient consolidation of prints shops.

There is a need to provide a methodology of evaluating options for consolidating multiple print shop sites into fewer consolidated sites such that the most appropriate consolidation options can be selected.

The embodiments disclosed herein therefore directly address the shortcomings of known techniques of evaluating print shop consolidation options by providing a methodology which enables consolidation options that will yield equivalent or improved performance over the original enterprise to be prioritized and selected.

BRIEF SUMMARY

It is therefore one aspect of the embodiments to provide a method for evaluating print shop consolidation options in an enterprise.

It is a further aspect of the embodiments to provide a system for evaluating print shop consolidation options.

It is another aspect of the embodiments to provide a method of operating a system for evaluating print shop consolidation options in an enterprise.

It is yet another aspect of the embodiments to provide a methodology for consolidating print shops in an enterprise into fewer consolidated locations It is also another aspect of the embodiments to provide a computer program for performing a method of evaluating print shop consolidations in an enterprise.

The aforementioned aspects and other objectives and advantages can now be achieved as described herein. In one aspect, a method evaluates the required operating capacities for each production function for each print shop for each consolidation configuration of distributed print shops in an enterprise so that the most appropriate print shop consolidation options can be selected to provide performance equivalent to or better than the original enterprise.

In particular, the operating capacity of a particular production function for processing print jobs at each shop is initially determined on the basis that the print jobs can originate and be processed at the same print shop. The operating capacity at each shop is modified to take into account scenarios in which the print jobs can originate at each print shop and can be transported to each other print shop for subsequent processing of the print job at each other shop. The determined maximum operating capacities at each shop can be mapped out for each possible configuration of consolidating a selected number of print shops into a selected number of consolidated shops. One or more consolidation options having the minimum required operating capacity can be selected for each production function. Consolidation options having the minimal operating capacity requirement through all possible consolidation configurations can be selected for each particular production function. The most appropriate consolation options can be prioritized and selected to consolidate print shops in a manner that will yield performance which is equivalent or better than the original enterprise performance.

Initially, a plurality of the distributed print shops is identified. Job data for any job(s) for each print shop is determined. The initial operating capacities of the production function(s) for each shop are calculated for the scenarios in which the job(s) originate and are processed at the same shop. The operating capacities are then modified to take into account the scenarios in which the jobs originating from each shop are sent to each other shop for processing. The delay in sending job(s) originating at each shop to each other shop for processing is estimated or measured. Thereafter, the modified operating capacities of the production function(s) for each shop are calculated for the scenarios in which each processes the job(s) originating from each of the other of the shops. Configurations of consolidating the plurality of shops together into a selected number of consolidated shops are determined. The operating capacities for each of the consolidation configurations for each production function are evaluated for each possible determined consolidation configuration to establish a consolidation configuration in which the operating capacities at each other shop can be allocated to the consolidated shop(s) such that the required operating capacity of the production function(s) for processing of the job(s) is minimized.

Configurations of consolidating the plurality of shops together for each and every possible number of consolidated shops can be determined. The consolidation configurations in which the operating capacities at each other shop can be allocated to the consolidated shop(s) can be evaluated to obtain the minimal required operating capacity of the production function(s) through all possible number of consolidated shops.

A cost number can be assigned to each of the minimized required operating capacity for each production function. The cost numbers can be aggregated providing a consolidation recommendation based on the aggregated cost numbers.

The initial and modified operating capacities of the production function(s) can be calculated by calculating the initial takt-rate over a given work period of the production function(s).

An automated system can be employed to implement the method of evaluating consolidation options of distributed print shops in an enterprise. The method of operating the system can comprise receiving data representing a plurality of the distributed print shops, receiving job data for any job(s) for each print shop, calculating from the job data a maximum initial takt-rate of the production function(s) for each shop over a predetermined time interval based the job(s) originating from and being processed at the same shop, estimating or receiving data representing the delay in sending the job(s) originating at each shop to each other shop for processing, calculating a maximum modified takt-rate of the production function(s) for each shop over a predetermined time interval on the basis of each shop processing the job(s) originating from each of the other of the shops, determining configurations of consolidating the plurality of shops together into a selected number of consolidated shops, and evaluating the takt-rates for each of the consolidation configurations for each production function to determine a consolidation configuration in which the takt-rates at each other shop can be allocated to the consolidated shop(s) such that the required takt-rates of the production function(s) for processing of the job(s) is minimized.

A computer program product in the form of a computer-usable data carrier storing instructions can be executed on a computer to cause the computer to perform the method of evaluating print shop consolidations of an enterprise.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

FIG. 3 illustrates a table including job data associated with a print shop for use in evaluating print shop consolidation options in accordance with an embodiment;

FIG. 4 illustrates a table including maximum daily initial takt-rate for black and white printing calculated based on the job data of FIG. 3;

FIG. 6 illustrates a table of job data of FIG. 2 but with the due dates offset to take into account transportation delay in accordance with the embodiment;

FIG. 7 illustrates a table of modified takt-rate for black and white printing calculated using the job data of FIG. 6;

FIG. 8 illustrates a table of black and white printing takt-rate for processing jobs at various print shop locations shown in FIG. 1 that require transportation from the shop of origination to the shop of production;

FIG. 9 illustrates a table of required takt-rate results for consolidating into shops S1 and S2 of FIG. 1 based on takt-rates taken from FIG. 8;

FIG. 10 illustrates a table of required takt-rate results for consolidating into shops S2 and S3 of FIG. 1 based on takt-rates taken from FIG. 8;

FIG. 11 illustrates a table of required takt-rate results for consolidating into shops S1 and S3 of FIG. 1 based on takt-rates taken from FIG. 8;

DETAILED DESCRIPTION

The illustrative embodiment provides an approach to evaluating options of consolidating print shops in an enterprise so that the most appropriate print shop consolidation options can be selected to provide equivalent or improved performance.

For the purposes of discussion hereinafter, a "print shop" refers to a grouping of printing resources. The print shop may be a freestanding entity such as a commercial printer or may be part of a corporation or other entity. A "print job" refers to a logical unit of work that is to be completed for a customer. For example, a request to make 10 copies of a book is a print job. Similarly, a request to make 100 copies of a single document is a print job. A production function can be any operation or processing step involved in the processing of the print job. For example, a production function can be black & white printing, color printing, scanning, or packaging.

Figure 1:
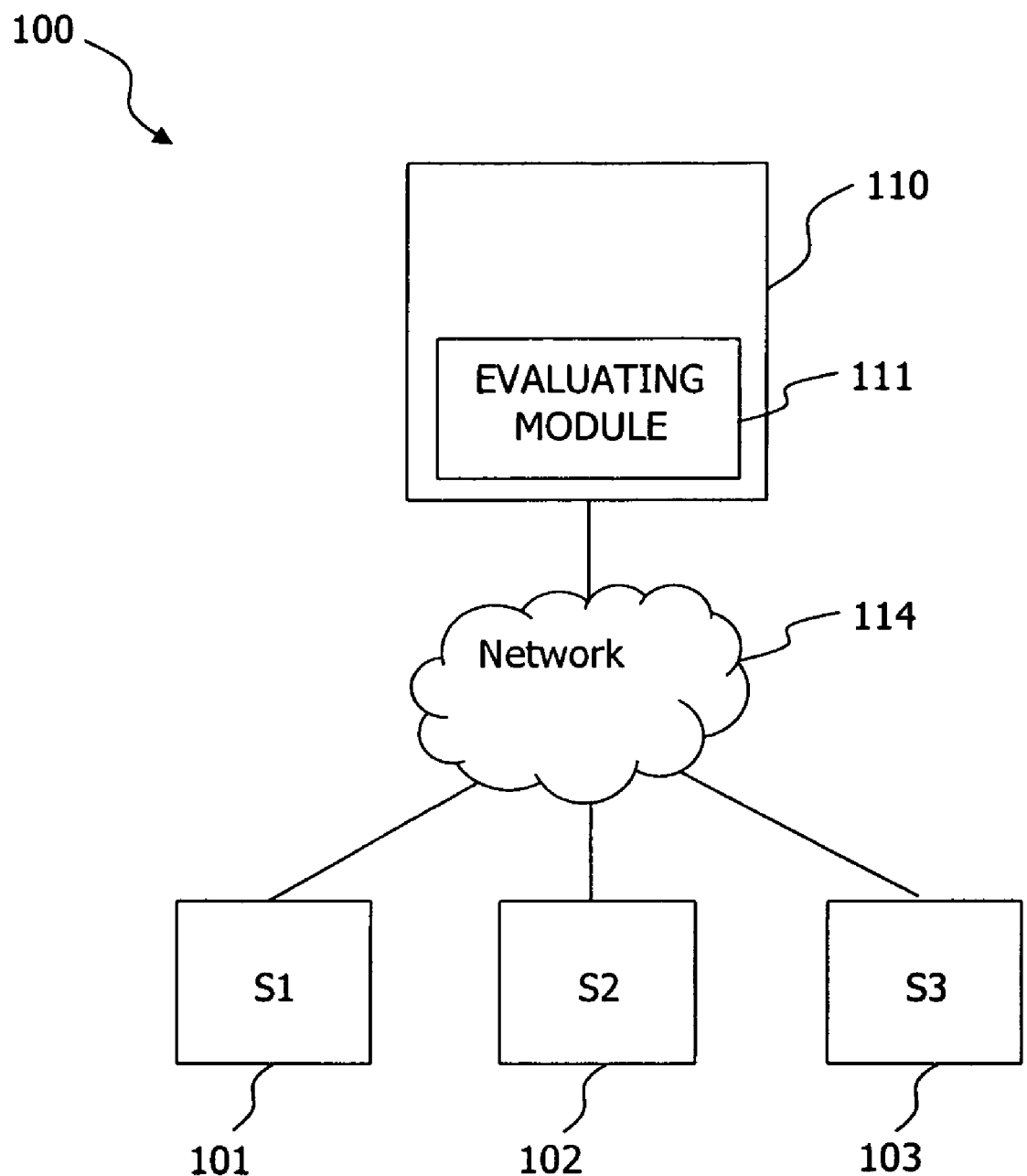
FIG. 1 illustrates a management system implemented on a computer for evaluating print shop consolidation options in an enterprise together with three print shops prior to consolidation in accordance with an embodiment.

Referring to FIG. 1 of the accompanying drawings, which illustrates a management system 110 for evaluating options of consolidating distributed print shops 101, 102, 103 in an enterprise, a suitable environment 100 for practicing the illustrative embodiment can be a management system 110 implemented on an electronic automated system. For example, the management system can be implemented on a stand-alone computer system, such as a workstation, or on a networked computer.

Those skilled in the art would understand that the illustration of FIG. 1 is merely depicting one example of the embodiments and that the embodiments are not limited thereto. As will be discussed in more detail below, the enterprise can have more than or less than three print shops. The management system 110 of FIG. 1 is operatively coupled, for example via a data network 114, to equipment, such as computers, located at the print shops, 101, 102, 103. However, a skilled person in the art would know that the management system need not be so operatively coupled for the purpose of obtaining data from the print shops. The management system may include a module 111 which is responsible for evaluating the consolidation options. The module 111 may be in the form of software or hardware. The module can be run locally on the management system or run from a remote location via a network coupled to the management system. A person skilled in the art would know that there are multiple modes of implementing such a module.

Figure 2:
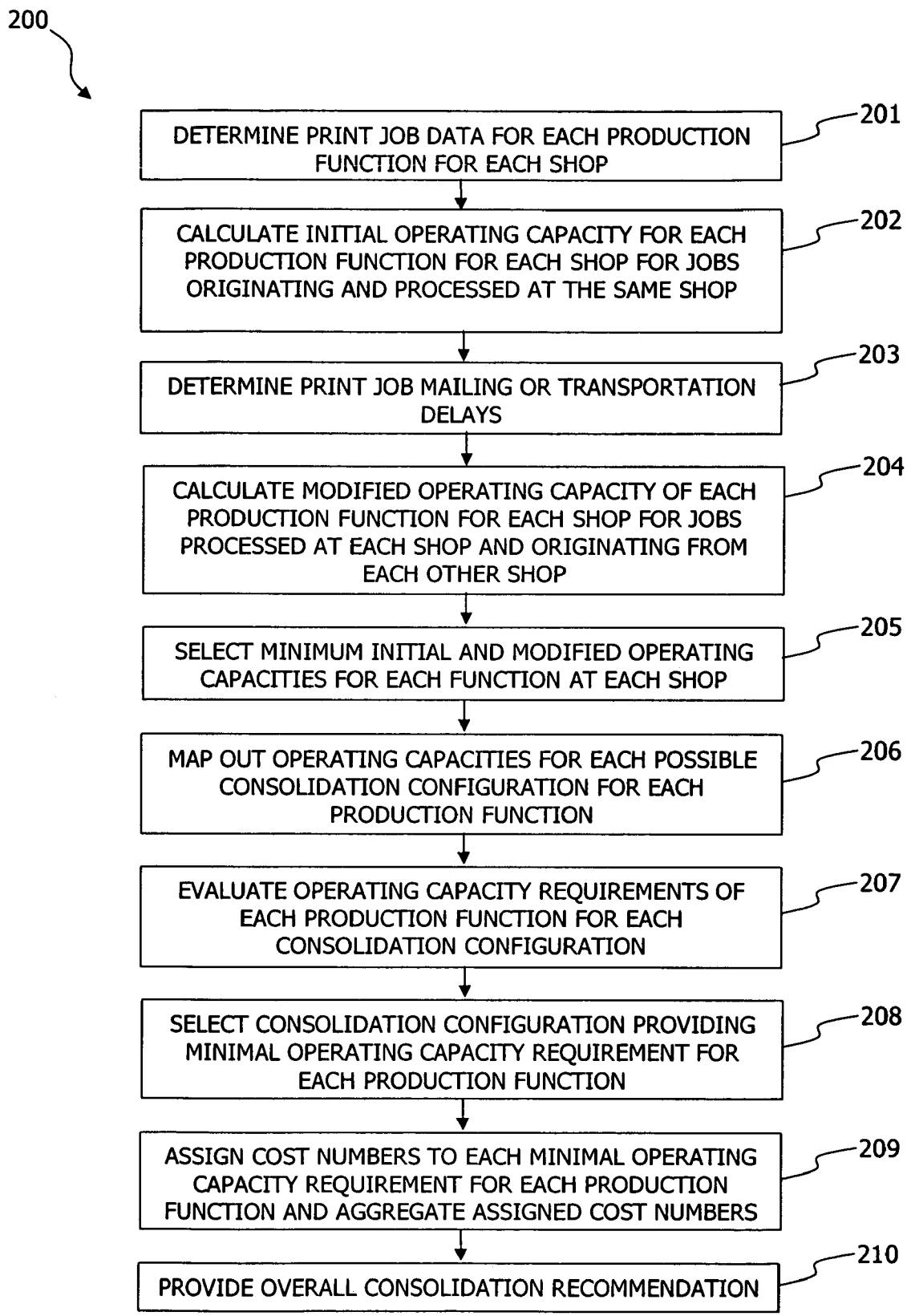
FIG. 2 illustrates a flow-diagram outlining steps which are performed in evaluating print shop consolidation options in an enterprise in accordance with an embodiment.
Figure 5:
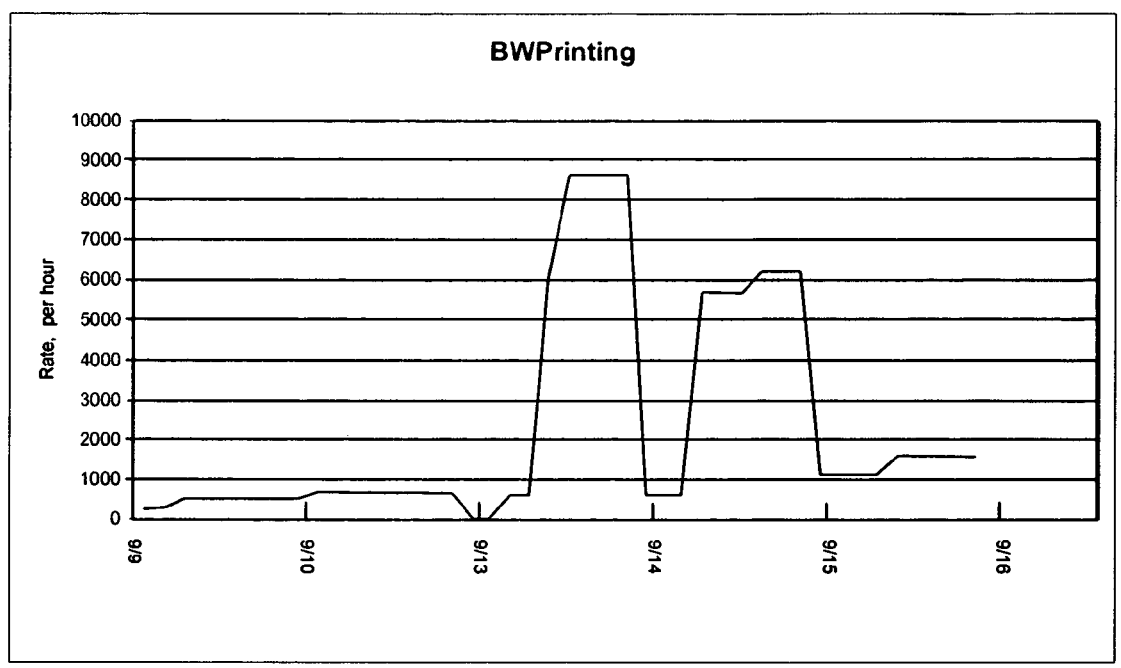
FIG. 5 illustrates a graph of takt-rate as a function of work days for the black and white printing for job data of FIG. 3.

FIG. 2 provides an overview of the steps which are performed in evaluating print shop consolidation options of the enterprise in the illustrative embodiment. Initially, the distributed print shops are identified and job data for each production function for each shop is determined (step 201 of FIG. 2). The job data represents a list of jobs and their characteristics, that is, the job arrival and due dates for each job, the production functions for processing each job and the number of impressions required to be produced by each production function for processing each job. Examples of job data for print shop 101 are shown in the form of a table in FIG. 3. The job data is determined by receiving the data at the management system 110. Alternatively, the job data can be estimated by the management system itself. Thereafter, the operating capacity of each production function in a given work period at each shop is estimated by the management system based on the scenario that all jobs that originate at each shop are processed at the same shop (step 202 in FIG. 2).

In this embodiment, the operating capacity is represented by the takt-rate TRi for each working day for each production function. In order to appreciate how the takt-rate is calculated, is useful to consider the following parameters. If there are n jobs $J_i$ and each job has an arrival time of $t\_arr_i$ and a due date of $t\_due_i$. Each job also has a production quantity $q_i$ associated with each processing step or production function where the processing step belongs to a set of workstations W with element $w_i$ with a processing rate of $r_i$. (A value of 0 for $q_i$ for some i implies that there is no processing associated with the workstation). The takt-rate $TR_i(t)$ (units required to be produced per unit time) on each workstation at any time t is therefore:

$$TR_i(t) = \sum_{i=1}^{n} \frac{q_i(t)}{t\_due_i - t\_arr_i} \quad (1)$$

where $q_i(t)=q_i$ if $t\_arr_i < t < t\_due_i$ and $q_i(t)=0$ otherwise

As an example, the total takt-rate for each working day for a particular production function, in this case, black and white printing, estimated by the management system 110 using the job data of FIG. 3, is shown in FIG. 4. Similar calculations of takt-rates can be preformed for the other production functions, nbooks, color printing, scanning and packaging referred to in the job data of FIG. 3.

If consolidation of print shops from multiple locations to fewer locations is to take place, it is necessary to take into account the scenario in which jobs may originate at one particular print shop 101, 102, 103 and then may be sent to a different print shop 101,102,103 for processing. Sending the jobs to another shop delays production. Consequently, the operating capacity associated with each production function at each shop increases. The initial calculated operating capacity therefore has to be modified to take into account the scenarios in which the print jobs originate at each print shop and can be transported to each other print shop for subsequent processing of the print job at each other shop.

To this end, the mailing or transportation times for sending jobs originating from each shop to each other shop for processing are received or estimated by the management system 110 (Step 203 of FIG. 2). The system subtracts these delay times from the corresponding original due times to take into account the sending delays. The modified operating capacity for each production function at each shop is estimated by the system using the new due times (step 204 of FIG. 2). For example, if jobs listed in FIG. 3 originating at first shop 101 are to be processed at a second shop 102 and the transportation time is 1 hr, then the total modified takt-rates for each production function at shop 102 for jobs originating from shop 101 for each working day estimated by the system will be as shown in the table of FIG. 6.

The maximum initial and modified takt-rates for each production function during a predetermined time interval are then calculated by the system (step 205 of FIG. 2). For example, from FIG. 4, the maximum black and white printing initial takt-rate requirement during a working week is 8625 impressions/hr and from FIG. 7, the maximum black and white printing modified takt-rate requirement during a working week is 10862 impressions/hr. If necessary, some other predetermined time interval can be selected or, alternatively, the takt-rates can be chosen based on criteria other than a maximum over a given period.

Using these analyses, configurations of consolidating a number of print shops into a few numbers of shops can be determined and the estimated maximum takt-rate for each production function for each configuration can be mapped out for each consolidation configuration (step 206 of FIG. 2). Accordingly, a takt-rate matrix $T_{ij}$ can be computed by the system where the $ij^{th}$ element denotes the maximum takt-rate for the scenario where all the jobs that have originated at shop i are processed at shop j. To illustrate this step, reference will now be made to the example of FIG. 8 which illustrates a matrix of maximum black and white printing takt-rates for jobs originating and processed at the three shops 101 (S1), 102 (S2), 103 (S3) of FIG. 1 and for jobs requiring transportation from each print shop 101 (S1), 102 (S2), 103 (S3) for processing at each other print shop 101 (S1), 102 (S2), 103 (S3). The row of indications S1, S2 & S3 at the top of the matrix represent shops of job production whereas the column of indications S1, S2 & S3 at the side of the matrix represents shops of job origination.

Thereafter, the system 110 determines the minimum operating capacity requirement for each consolidation configuration to evaluate the options of consolidating a number of print shops 101, 102, 103 into fewer consolidated shops (step 207 of FIG. 2). To illustrate this step, reference is once again made to the example of the matrix of FIG. 8. Suppose it is necessary to determine the consolidation options for the case in which the 3 shops 101 (S1), 102 (S2), 103 (S3) are to be consolidated into 1 location. The maximum production takt-rate for the situation will be evaluated when the shops are collocated at each of one of the three locations. Therefore, if all shops are consolidated into 1 location which happens to be shop 101 (S1); then the total takt-rate for black and white printing is (8625+10386+6633)=25644 impressions/h. If the shops are consolidated at 102 (S2) the total takt-rate is (10862+9078+3379)=23319 impressions/h. Similarly, the result of consolidation at 102 (S2) is 27400 impressions/h. Therefore the best option is to consolidate at location 102 (S2) since it gives the minimum takt-rate for the enterprise.

In order to evaluate the consolidation options when the shop consolidation occurs at 2 shops, options of consolidation at 101 (S1), 102 (S2) or 102 (S2), 103 (S3) or 101 (S1), 103 (S3) are evaluated by the system. For the situation of consolidating into two shops 101 (S1) and 102 (S2), it is assumed that all jobs should be performed at the shop with lowest takt-rate. Therefore according to FIG. 8, all jobs at 101 (S1) will be performed at 101 (S1) because the lowest takt-rate is 8625 and occurs at 101 (S1). Similarly, since jobs that originate from 102 (S2) can be processed at 102 (S2) at a lower required takt-rate than if they are processed at 101 (S1), the jobs originating from 102 (S2) are assigned to 102 (S2) for processing. Similarly, the jobs originating at 103 (S3) are better allocated to 102 (S2) because takt-rate required to process the jobs is lower if they are process at 102 (S2) than if they are processed at 101 (S1). The result of this allocation of job capacity to shops 101 (S1) and 102 (S2) leads to a total capacity allocation of 21082 impressions/h for the Black and White printing production function as shown in FIG. 9.

Matrices and total capacity allocations for the other two possible consolidation options of consolidating the three shops into consolidated shops 102 (S2) and 103 (S3) and into consolidated shops 101 (S1) and 103 (S3) are shown in FIG. 10 and FIG. 11, respectively.

Figures 12, 13:
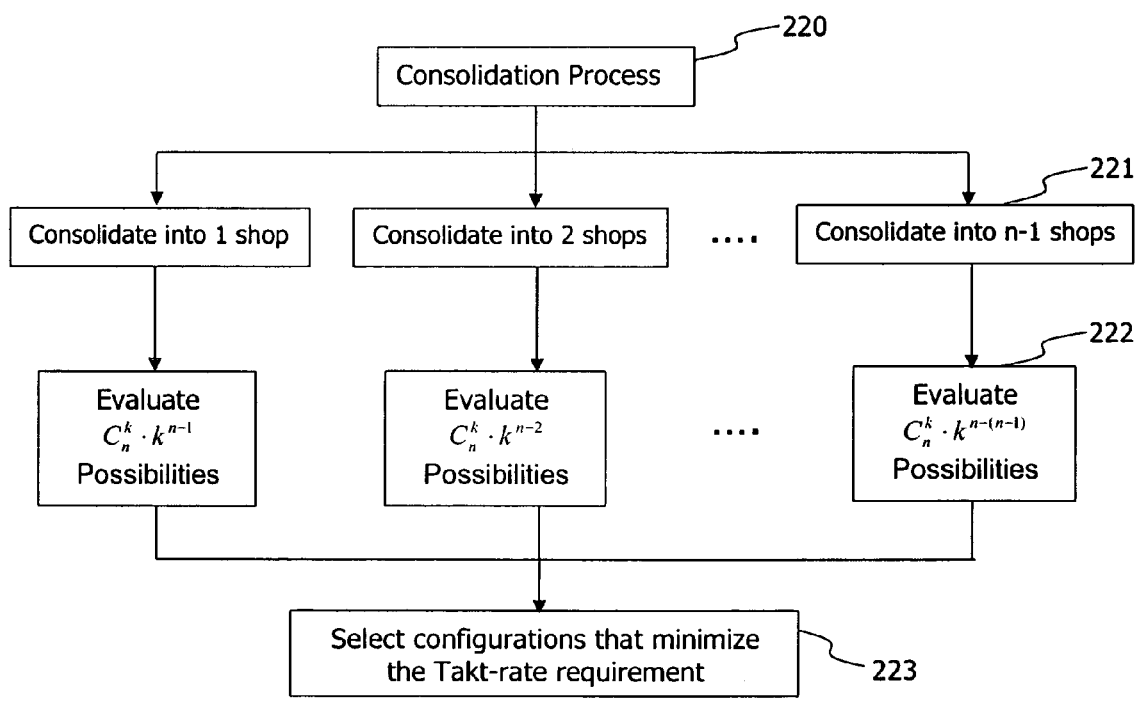
FIG. 12 illustrates a matrix of required takt-rate capacities for various possible options of consolidating the three print shops of FIG. 1.
FIG. 13 illustrates a block diagram outlining general consolidation process modules of determining the required minimal takt-rates for each production function for all possible consolidation options irrespective of the number of consolidated shops.

Referring to FIG. 12, which illustrates a chart summarizing the takt-rate requirement for the various consolidation options, clearly, in this example, the takt-rate (and hence required capacity) for black and white printing is minimized by choosing the option of consolidation at print shop 101 (S1) and 102 (S2).

A similar analysis can be performed for other production functions such as Color Printing. The capacity requirement can be mapped to a cost number and then various cost numbers for each function including costs of facility, labor and other related items can be aggregated into a single cost number for each option (Step 209 of FIG. 2). This can be sorted to provide an overall consolidation recommendation (Step 210 of FIG. 2).

It is possible to extend the example given above to a more general case where there are a total of n number of print shops to be consolidated and k (<n) number of desired shops after consolidation. In order to appreciate how the system 110 determines all possible consolidation configurations in such a general case, it is useful to express the total number of possible configurations $P_k$ to consolidate n shops to k shops as follows:

$$P_k = C_n^k \cdot k^{n-k} \text{ where } C_n^k = \frac{n!}{(n-k)!k!} \qquad (2)$$

The total number of possible configurations P to consolidate n shops regardless of how many consolidated shops will be produced can be expressed as follows:

$$P = \sum_{k=1}^{n-1} (C_n^k \cdot k^{n-k}) \qquad (3)$$

FIG. 13 illustrates a block-diagram of operational modules of the consolidation process for the more general case. In order to determine the best consolidation options, it is necessary to search for configurations that have the minimal Takt rate through all P possible configurations.

It will be appreciated that variations of the above-disclosed and other features, aspects and functions, or alternatives thereof, may be desirably combined into many other different systems or applications.

Also, it will be appreciated that various presently unforeseen or unanticipated alternatives, modifications, variations or improvements therein may be subsequently made by those skilled in the art which are also intended to be encompassed by the following claims.

What is claimed is:

1. A method of evaluating consolidation configurations of distributed print shops in an enterprise comprising:
   identifying a plurality of said distributed print shops,
   determining job data for any print job(s) for each print shop,
   calculating the initial operating capacities of at least one production function for each print shop on the basis of said job(s) originating from and being processed at the same print shop,
   calculating modified operating capacities of the production function(s) for each print shop on the basis of each print shop processing said job(s) originating from each of the other of said print shops,
   determining configurations of consolidating said plurality of print shops together into a number of consolidated print shops, and
   evaluating said operating capacities for each of said consolidation configurations for each production function to determine at least one consolidation configuration in which the operating capacities at each other print shop can be allocated to said consolidated print shop(s) such that the required operating capacity of the production function(s) for processing of said job(s) is minimized.

2. The method of claim 1, further comprising determining configurations of consolidating said plurality of print shops together for each possible number of consolidated print shops, and determining said consolidation configurations in which the operating capacities at each other print shop can be allocated to said consolidated print shop(s) such that the required operating capacity of the production function(s) through all possible number of consolidated print shops is minimal.

3. The method of claim 1, further comprising assigning a cost number to each of said minimized required operating capacities for each production function, and aggregating said cost numbers, providing a consolidation recommendation based on said aggregated cost numbers.

4. The method of claim 1, wherein calculating said initial operating capacities comprises calculating the maximum initial operating capacity of the production function(s) within a selected time interval.

5. The method of claim 1, wherein calculating said initial operating capacities of the production function(s) comprises calculating the initial takt-rate over a given work period of the production function(s).

6. The method of claim 5, wherein calculating the initial takt rate comprises determining arrival time(s) and due time(s) of said processing job(s), determining job time(s) from said arrival time(s) and due(s), aggregating said job times, determining the production quantity associated with the or each production function for processing said job(s), and dividing said production quantity by the aggregated job time.

7. The method of claim 1, wherein calculating said modified operating capacities comprises calculating the maximum modified operating capacity of the production function(s) within said selected time interval.

8. The method of claim 1, wherein calculating said modified operating capacities comprises calculating the modified takt-rate over a given work period for the production function(s).

9. The method of claim 8, wherein calculating said modified takt-rate comprises determining arrival time and due time of the or each job,
   determining the delay in sending said job(s) originating at each print shop to each other print shop for processing,
   subtracting said sending delay from the due date to provide a modified due date, calculating the time period between the arrival date and the modified due date of the or each job to determine the modified job time periods, aggregating said modified job times, determining the production quantity associated with the or each production function for processing said job(s), dividing said production quantity by the aggregated job time.

10. The method of claim 1, further comprising determining configurations to consolidate said plurality of print shops into a single consolidated print shop, and wherein evaluating said configurations comprises,
    aggregating the initial and modified operating capacities of the production function(s) for each possible consolidated print shop to provide a total required operating capacity at each consolidated print shop for the production function(s).

11. The method of claim 1, further comprising determining configurations to consolidate said plurality of print shops into a group of consolidated print shops, wherein evaluating said configurations comprises selectively allocating the operating capacity of the production function(s) to the consolidated print shop in said group having the lowest modified operating capacity at said consolidated print shop, and aggregating said initial operating capacity and said allocated modified operating capacity of the production function(s) at each consolidated print shop to provide a total required operating capacity for the or each plurality of consolidated print shops for the production function(s).

12. The method of claim 1, further comprising selecting the consolidated print shop or the plurality of consolidated print shops for which said required operating capacity is minimized.

13. A method of operating an automated system to evaluate consolidation configurations of distributed print shops in an enterprise comprising:

receiving data identifying a plurality of said distributed print shops, receiving or estimating job data for any job(s) for each print shop, calculating from said job data a maximum initial takt-rate of the production function(s) for each print shop over a predetermined time interval on the basis of said job(s) originating from and being processed at the same print shop, estimating or receiving data representing the delay in sending said job(s) originating at each print shop to each other print shop for processing, calculating a maximum modified takt-rate of production function(s) for each print shop over a predetermined time interval on the basis of each print shop processing said job(s) originating from each of the other of said print shops, determining configurations of consolidating said plurality of print shops together into a number of consolidated print shops, and evaluating said takt-rates for each of said consolidation configurations for each production function to determine at least one consolidation configuration in which the takt-rates at each other print shop can be allocated to said consolidated print shop(s) such that the required takt-rates of the production function(s) for processing of said job(s) is minimized.

14. The method of claim 13, further comprising determining configurations of consolidating said plurality of print shops together for each and every possible number of consolidated print shops, and determining said consolidation configurations in which the takt-rates at each other print shop can be allocated to said consolidated print shop(s) such that the required takt-rates of the production function(s) through all possible number of consolidated print shops is minimal.

15. The method of claim 13, further comprising receiving data representing cost numbers, assigning a cost number to each of said minimized required operating capacities for each production function, and aggregating said cost numbers, providing a consolidation recommendation based on said aggregated cost numbers.

16. The method of claim 13, wherein receiving job data comprises receiving or estimating data representing arrival time(s) and due time(s) for the or each job, receiving or estimating data representing the production quantity associated with the production function(s) for processing said job(s), and wherein calculating the initial takt-rate comprises determining said job time period(s) from said arrival time(s) and due time(s) for said job(s), aggregating said job time periods, and dividing the production quantity for the production function(s) by said aggregated job time period.

17. The method of claim 13, wherein calculating said modified takt-rate comprises subtracting said sending delay(s) from said due time(s) to provide modified due date(s), calculating the time period between the arrival time and the modified due date of the or each job to determine the modified job time period, aggregating said modified job time periods, determining the production quantity associated with the production function(s) for the job(s), and dividing the production quantity for the production function(s) by said aggregated modified job time periods.

18. A computer program product comprising:

a computer-usable data carrier storing instructions that, when executed by a computer, cause the computer to perform a method of evaluating distributed print shop consolidations of an enterprise comprising identifying a plurality of said distributed print shops, determining job data for any print job(s) for each print shop, calculating the initial operating capacities of the of at least one production function for each print shop on the basis of said job(s) originating from and being processed at the same print shop, determining a delay in sending said job(s) originating at each print shop to each other print shop for processing, calculating modified operating capacities of the production function(s) for each print shop on the basis of each print shop processing said job(s) originating from each of the other of said print shops, determining configurations of consolidating said plurality of print shops together into a selected number of consolidated print shops, and evaluating said operating capacities for each of said consolidation configurations for each production function to determine at least one consolidation configuration in which the operating capacities at each other print shop can be allocated to said consolidated print shop(s) such that the required operating capacity of the production function(s) for processing of said job(s) is minimized.

19. The method of claim 18, further comprising determining configurations of consolidating said plurality of print shops together for each and every possible number of consolidated print shops, and determine said consolidation configurations in which the operating capacities at each other print shop can be allocated to said consolidated print shop(s) such that the required operating capacity of the production function(s) through all possible number of consolidated print shops is minimal.

20. The method of claim 18, further comprising assigning a cost number to each of said minimized required operating capacities for each production function, and aggregating said cost numbers, providing a consolidation recommendation based on said aggregated cost numbers.

* * * * *